US012681746B2

(12) United States Patent
Ng et al.

(10) Patent No.: US 12,681,746 B2
(45) Date of Patent: Jul. 14, 2026

(54) ADDRESS-SPACE-IDENTIFIER-BASED SECURITY OF DATA TRANSFER REQUESTS

(71) Applicants:ATI TECHNOLOGIES ULC, Markham (CA); ADVANCED MICRO DEVICES, INC., Santa Clara, CA (US)

(72) Inventors: Philip Ng, Toronto (CA); Nippon Raval, Markham (CA); Jeremy W. Powell, Austin, TX (US); Donald Matthews, Jr., Ft. Collins, CO (US); David Kaplan, Austin, TX (US)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 587 days.

(21) Appl. No.: 18/113,912

(22) Filed: Feb. 24, 2023

(65) Prior Publication Data

US 2024/0289151 A1     Aug. 29, 2024

(51) Int. Cl.
| | |
|---|---|
| *G06F 9/455* | (2018.01) |
| *G06F 9/38* | (2018.01) |
| *G06F 12/1081* | (2016.01) |
| *G06F 13/28* | (2006.01) |
| *G06F 21/57* | (2013.01) |
| *G06F 21/62* | (2013.01) |
| *H04L 15/16* | (2006.01) |

(52) U.S. Cl.
CPC ............... *G06F 9/45558* (2013.01); *G06F 2009/45579* (2013.01); *G06F 2009/45583* (2013.01); *G06F 2009/45587* (2013.01)

(58) Field of Classification Search
CPC ....... G06F 9/45558; G06F 2009/45579; G06F 2009/45583; G06F 2009/45587
USPC .......................................................... 726/26
See application file for complete search history.

(56) References Cited

U.S. PATENT DOCUMENTS 9,317,452 B1 * 4/2016 Forschmiedt ....... G06F 9/45558
2012/0233378 A1 9/2012 Elteto
(Continued)

FOREIGN PATENT DOCUMENTS

CN 109643293 A * 4/2019 ......... G06F 13/1663

OTHER PUBLICATIONS

International Search Report and Written Opinion issued in Application No. PCT/US2024/010685, mailed May 9, 2024, 10 pages.
(Continued)

*Primary Examiner* — Berhanu Shitayewoldetadik

(57) ABSTRACT

A processor configured to execute one or more virtual machines (VMs) includes an input-output memory management unit (IOMMU) configured to handle memory-mapped input-output (MMIO) requests and direct memory access (DMA) requests from a processor core of the processor or one or more input/output (I/O) devices. In response to receiving an MMIO or DMA request, the IOMMU is configured to determine a VM associated with the request. The IOMMU then checks a security indicator field of an address space identifier (ASID) mask table to determine if the VM was previously the target of an attack by a malicious entity. In response to the VM previously being a target of an attack, the IOMMU denies the received MMIO or DMA request.

17 Claims, 7 Drawing Sheets

(56)  References Cited

U.S. PATENT DOCUMENTS

| 2015/0013008 A1* | 1/2015 | Lukacs | G06F 21/53 |
| | | | 726/24 |
| 2018/0011797 A1* | 1/2018 | Shi | G06F 9/45545 |
| 2018/0107608 A1* | 4/2018 | Kaplan | G06F 12/1466 |
| 2019/0042476 A1* | 2/2019 | Chhabra | G06F 21/85 |
| 2019/0207764 A1* | 7/2019 | Maximov | G06F 21/575 |
| 2019/0228145 A1* | 7/2019 | Shanbhogue | G06F 13/1668 |
| 2021/0019170 A1* | 1/2021 | Sugano | G06F 11/07 |
| 2023/0058863 A1 | 2/2023 | Wang et al. | |

OTHER PUBLICATIONS

International Preliminary Report on Patentability mailed Sep. 4, 2025 for PCT/US2024/010685, 7 pages.

* cited by examiner

ADDRESS-SPACE-IDENTIFIER-BASED SECURITY OF DATA TRANSFER REQUESTS

BACKGROUND

In a confidential computing environment, a processing system (e.g., a server) executes multiple software programs, such as virtual machines (VMs) and a virtual machine manager (e.g., a hypervisor), owned by different entities. As an example, some confidential computing environments include multiple VMs being executed in the environment that are each owned by different companies. To control such VMs within the confidential computing environment, the confidential computing environment includes a virtual machine manager (e.g., a hypervisor) that controls the scheduling of the different VMs for execution and provides an interface between the VMs and the server hardware. For example, the virtual machine manager controls the scheduling of the different VMs so that each VM operates as if that VM were executing on its own dedicated hardware. However, in the event that the virtual machine manager (e.g., hypervisor) is a malicious actor, the confidential information of the VMs is at risk of being exposed to unauthorized entities. For example, the malicious virtual machine manager modifies mappings of the page tables associated with VMs such that the requested data is redirected to another address or memory requests are blocked, potentially exposing such data to the malicious virtual machine manager or other entities, and causing the confidential computing environment to be less secure.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
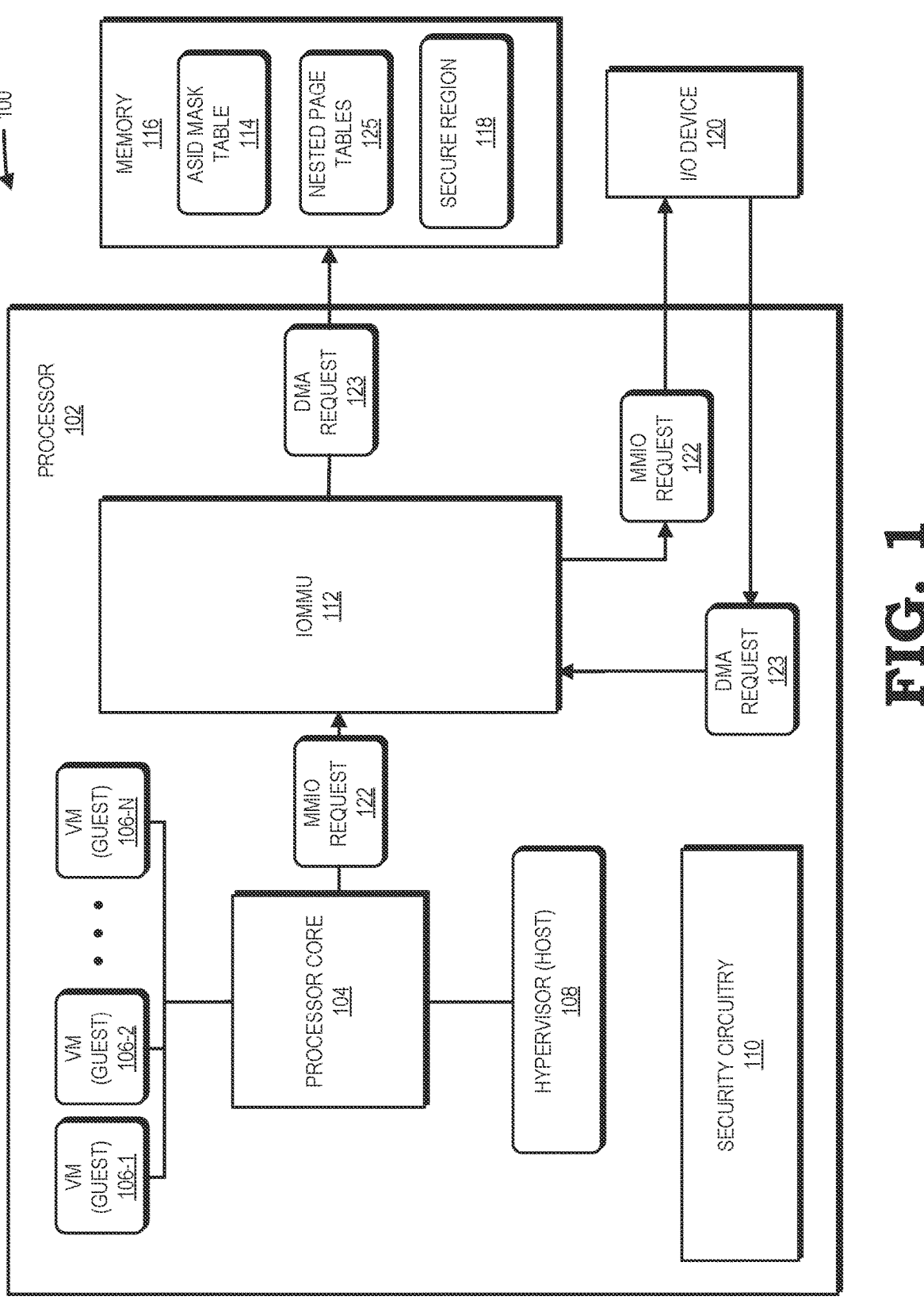
FIG. 1 is a block diagram of a processing system that employs an input-output memory management unit (IOMMU) to manage memory-mapped input/output (MMIO) requests and direct memory access (DMA) requests based on security indicator fields, in accordance with some embodiments.

In a processing system, multiple virtual machines (VMs) are executed by one or more processors of the processing system. To facilitate the execution of the VMs, the processing system (e.g., a security circuitry of the processing system) allocates one or more respective memory address spaces to each of the VMs. Such memory address spaces include virtualized memory portions (e.g., pages) of physical memory in the processing system, physical memories of one or more I/O devices, or both. Further, memory address spaces allocated to a VM are associated with an address space identifier (ASID) including a unique identifier for the allocated memory address spaces. Additionally, to facilitate the execution of the VMs, a processor of the processing system includes or is otherwise connected to a hypervisor configured to control the scheduling of the different VMs for execution and to provide an interface between the VMs and the hardware (e.g., I/O devices) of the processing system, manage the mapping of the page tables used to translate the virtual addresses of the memory address spaces to physical addresses, or both.

When executing a VM, one or more processors of the processing system each include processor cores that access memories of I/O devices of the processing system by issuing memory mapped I/O (MMIO) requests. Additionally, in some embodiments, when execurting a VM, one or more I/O devices of the processing system access memories of other I/O devices by issuing MMIO requests (e.g., peer-to-peer requests). Each MMIO request, for example, includes data identifying a memory address (e.g., virtual memory address) of an I/O device from which data is to be read, a memory address of an I/O device to which data is to be written, or both. For example, a processor core programs a particular register of an I/O device by issuing an MMIO request to write data to a memory address (e.g., virtual memory address) associated with the register. By using memory addresses to provide information to, or retrieve information from, an I/O device, the processor core interacts with the I/O device using a relatively simple set of access commands and by leveraging at least some hardware used to access system memory. As such, the overall efficiency of the processor core improves. Further, when executing a VM, one or more I/O devices of the processing system are configured to access a memory (e.g., system memory) of the processing system by issuing one or more direct memory access (DMA) requests. Such DMA requests, for example, include data identifying a memory address (e.g., virtual memory address) of a memory from which data is to be read, a memory address of a memory from which data is to be written, or both.

To further improve processing efficiency, an input-output memory management unit (IOMMU) of the processing system assists in the translation of DMA requests by translating virtual addresses to system physical addresses rather than a memory controller or central processing unit (CPU) performing such translations of memory addresses for DMA requests. Additionally, the IOMMU is configured to handle (e.g., perform) one or more MMIO requests issued from a processor core or I/O device. However, in at least some cases, one or more issued MMIO requests, DMA requests, or both render secure data of the processing system vulnerable to unauthorized access or modification. For example, within the processing system, a hypervisor is configured to maintain the page table mappings (e.g., nested page tables that map the virtual address of a VM memory to physical memory addresses) used to translate virtual addresses to system physical addresses. In embodiments, a malicious hypervisor is able to modify, manipulate, or both the page table mappings for virtual addresses to selectively misroute, block, or both MMIO requests, DMA requests, or both that are provided to the IOMMU. For example, regarding a DMA request, a malicious hypervisor is configured to modify page table mappings for virtual addresses identified in the DMA request provided to the IOMMU. The IOMMU then uses the modified mappings to translate the virtual addresses identified in the DMA request which causes the data identified in the DMA request to be rerouted to a changed memory address rather than the intended (e.g., initial) memory address indicated in the DMA request, causes the VM associated with DMA request to read incorrect or stale data from the changed memory address, or both. As such, the data requested by the DMA request for a VM is potentially exposed to unauthorized access or modification by unwanted entities such as the malicious hypervisor, malicious VMs, or both. Regarding an MMIO request, a malicious hypervisor is configured to modify page table mappings to unmap one or more I/O buffers relating to an MMIO request while still allowing data indicating the completion of the MMIO request (e.g., a completion write flag, write-to-buffer completion flag) to be written. The data indicating the completion of the MMIO request indicates to the VM associated with the MMIO request that the MMIO request was completed even though the I/O buffers were unmapped and the MMIO request was not actually completed. As such, the VM associated with the MMIO request reads stale data from the I/O buffer rather than the intended data (e.g., the data indicated in the MMIO request), potentially exposing such data to unwanted entities such as the malicious hypervisor, malicious VMs, or both. In this way, the malicious hypervisor blocks the MMIO request associated with the VM by unmapping the I/O buffers associated with the MMIO request.

To prevent these and similar attacks, a processing system, using the techniques described herein, employs an IOMMU to ensure that one or more VMs associated with a MMIO request, DMA request, or both have not previously been targets of such attacks. For example, in some embodiments, the IOMMU maintains an ASID mask table (e.g., stored in a memory) that includes a number of entries each associated with a respective ASID. These entries, for example, identify the ASIDs of the memory address spaces allocated to the VMs (e.g., to one or more processes of the VM) being executed on the processing system. According to embodiments, each entry of the ASID mask table further identifies a security indicator field for a respective ASID. Such security indicator fields for a respective ASID, for example, include data (e.g., bits) indicating whether an MMIO request associated with the ASID is to be performed, whether a DMA request associated with the ASID is to be performed, or both. For example, in some embodiments, a malicious hypervisor changes the page table mappings to selectively misroute or block an MMIO request or DMA request provided to IOMMU. Regarding a DMA request, due to the changed page table mapping, the IOMMU translates the virtual address in the DMA request such that a block data indicated in the DMA request will be misrouted to a changed address (e.g., due to the changed mapping) rather than the intended (e.g., initial) address. By misrouting the block of data to the changed address in the DMA request in this way, a transfer failure (e.g., page fault) occurs as the block of data was not directed to the intended address. Further, regarding an MMIO request, due to the changed page table mapping, one or more I/O buffers associated with the MMIO request are unmapped while still allowing data indicating the completion of the MMIO request (e.g., a completion write flag, write-to-buffer completion flag) to be written. In response to such data indicating the completion of the MMIO request, the VM associated with the MMIO request reads stale data from the I/O buffers as the MMIO request was blocked due to the I/O buffers being unmapped. Because the I/O buffers are unmapped and the VM reads stale (e.g., incorrect) data from the I/O buffers, a transfer failure (e.g., page fault) occurs.

In response to such transfer failures, the IOMMU determines the MMIO request or DMA request that caused the transfer failure and a VM associated with the MMIO request or DMA request (e.g., the VM that issued the MMIO or DMA request, the VM that was a target of the MMIO request or DMA request, or both). After determining the associated VM, the IOMMU sets one or more bits in a security indicator field associated with an ASID assigned to the determined VM in the ASID mask table to indicate that the VM was a target of an attack. For example, in response to determining the VM associated with an MMIO request was a target of an attack, the IOMMU updates a bit in the security indicator field associated with an ASID assigned to the VM to indicate that an MMIO request associated with the ASID (e.g., the VM) is not to be performed. As another example, in response to determining the VM associated with a DMA request was a target of an attack, the IOMMU updates a bit in the security indicator field associated with an ASID assigned to the VM to indicate that a DMA request associated with the ASID (e.g., the VM) is not to be performed After receiving an MMIO request from a processor core, an MMIO request from an I/O device, a DMA request from an I/O device, or any combination thereof, the IOMMU determines the VM associated with the request by, for example, using one or more tables mapping virtual machine identifiers (VMIDs), ASIDs, or both to memory addresses identified in the received MMIO requests and DMA requests. The IOMMU then determines whether a security indicator field associated with the ASID assigned to the determined VM indicates whether MMIO requests, DMA requests, or both associated with the VM (e.g., the ASID of the VM) are allowed (e.g., are to be performed). For example, the IOMMU checks whether one or more bits of a security indicator field associated with the ASID in the ASID mask table indicate that an MMIO request, DMA request, or both are to be performed. In response to the security indicator field associated with the ASID indicating an MMIO request, DMA request, or both are not to be performed (e.g., indicating that the VM associated with the MMIO or DMA request was a target of an attack), the IOMMU prevents execution of the MMIO request or DMA request as described herein, such as by preventing translation of virtual memory addresses to physical addresses, not writing data indicating the completion of an MMIO request or DMA request, or both. In response to the security indicator field associated with the ASID indicating an MMIO request, DMA request, or both are to be performed (e.g., the VM associated with the MMIO or DMA request was not a target of an attack), the IOMMU executes the MMIO request of DMA request. Thus, using the techniques described herein, an IOMMU prevents the execution of an MMIO request or DMA request on behalf of a VM when the VM was previously the target of an attack, by, for example, a malicious hypervisor. The IOMMU thus prevents unauthorized access to, or modification of, confidential information associated with a VM. Further, because these security operations are performed by the IOMMU itself, it is difficult for a malicious hypervisor to interfere with those operations, thus supporting secure MMIO and DMA accesses in confidential computing environments.

FIG. 1 illustrates processing system 100 that employs an input-output memory management unit (IOMMU) to manage memory-mapped input/output (MMIO) requests and direct memory access (DMA) requests based on security indicator fields, in accordance with some embodiments. Processing system 100 is generally configured to execute sets of instructions (e.g., computer programs) to carry out tasks on behalf of an electronic device. For example, in response to receiving a set of instructions, processing system 100 is configured to perform one or more operations indicated in the set of instructions. Accordingly, in different embodiments, processing system 100 is part of any of a variety of electronic devices. For purposes of description, it is assumed that processing system 100 is part of an electronic device that implements a confidential computing environment, such as a server. However, in other embodiments, processing system 100 is part of a desktop computer, laptop computer, tablet, game console, and the like.

To implement the confidential computing environment, and to execute the sets of instructions and corresponding operations, processing system 100 includes processor 102, memory 116, and one or more input/output (I/O) devices, such as I/O device 120. In some embodiments, processor 102 is a general-purpose processor, such as a central processing unit (CPU) including hardware-based circuitry, software-based circuitry, or both configured to retrieve and execute the sets of instructions. Memory 116 includes one or more memory devices configured to store and retrieve data based on commands (e.g., store and load commands) received from processor 102. Accordingly, in other embodiments, memory 116 is a random access memory (RAM), dynamic random-access memory (DRAM), static random-access memory (SRAM), non-volatile memory (NVM), hard disc memory, and the like, or any combination thereof.

I/O device 120 includes a device configured to, independent of processor 102, process input information, output information, or a combination thereof on behalf of processing system 100. For example, in some embodiments, I/O device 120 is a network interface device that processes input and output information for a network (not shown) connected to processing system 100. As another example, I/O device 120 is a storage controller (e.g., a disc controller NVM storage controller), a controller associated with a user interface (e.g., a keyboard), to name a couple.

To execute the sets of instructions and corresponding operations, processor 102 includes processor core 104, security circuitry 110, and IOMMU 112. It will be appreciated that, in some embodiments, processor 102 includes additional hardware to execute instructions, and to execute operations based on those instructions, such as additional processor cores, additional processing units (e.g., one or more parallel processing units, vector processing units, scalar processing units), one or more controllers (e.g., memory controllers, input/output controllers), or any combination thereof, to name a few.

To execute a set of instructions, processor core 104 includes one or more instruction pipelines including a plurality of stages to execute instructions in a pipelined fashion. Thus, for example, in some embodiments an instruction pipeline of processor core 104 includes a fetch stage, a decode stage, a dispatch stage, one or more execution stages (with one or more corresponding execution units), a retire stage, or any combination thereof, to name a few. According to embodiments, processor core 104 also includes, or has access to, memory structures and other hardware (not explicitly illustrated in FIG. 1) that support the execution of instructions. For example, in some embodiments, processor core 104 includes or has access to one or more cache structures to store data used for the execution of the instructions.

As noted above, processing system 100 is generally configured to implement a confidential computing environment, and in particular to execute a plurality of virtual machines (VMs) (e.g., VMs 106), also referred to as guests, and a hypervisor 108, also referred to as a host, to manage the execution of the plurality of VMs. Though the example embodiment illustrated in FIG. 1 presents processing system 100 executing three VMs (106-1, 106-2, 106-N) representing an N number of VMs, in other embodiments processing system is configured to execute any number of VMs 106. In embodiments, because two or more VMs 106, and at least in some cases the hypervisor 108, are owned by different entities, processing system 100 implements security features to protect the data of a given VM 106 from access by other software, such as by another VM 106 or by the hypervisor 108. For example, processing system 100 implements data security for VMs 106 by implementing secure region 118 of memory 116 that stores, for example, encrypted data. In particular, processor 102 is configured to encrypt respective specified data for one or more VMs 106 according to a corresponding private cryptographic key and to store the resulting encrypted data at secure region 118. Because the data is encrypted, the data for the first VM 106 is protected from unauthorized access by one or more other VMs 106, hypervisor 108, or both. In at least some embodiments, cryptographic keys for the VMs 106 are managed by security circuitry 110, and data encryption and decryption for the VMs 106 is executed by a dedicated hardware encryption/decryption module (not shown) at a memory controller (not shown) of processor 102.

To further help secure the confidential computing environment, processor 102 includes security circuitry 110 that includes hardware-based circuitry, software-based circuitry, or both generally configured to create, monitor, and maintain the security environment for processor 102. For example, in at least some embodiments, security circuitry 110 is configured to manage a boot process for processor 102, initialize security-related mechanisms for processor 102, monitor processing system 100 for suspicious activity or events, and implement an appropriate response, or any combination thereof. According to embodiments, security circuitry 110 includes, for example, a microcontroller, a cryptographic coprocessor (CCP) (e.g., configured to encrypt and decrypt data), local memory and local registers (e.g., configured to store cryptographic keys), interfaces configured to interact with memory 116, the I/O controller of processor 102, and configuration registers (e.g., hardware registers) of processor 102, or any combination thereof. In embodiments, security circuitry 110 includes, for example, Environment Management Control hardware that performs environmental and security checking to help ensure that processor 102 is operating according to one or more specified security parameters.

According to embodiments, security circuitry 110 is configured to define one or more memory address spaces in processing system 100 based on, for example, memory 116, registers and other storage locations of I/O devices (e.g., I/O device 120), or both. For example, in preparation for processor 102 launching a VM 106, security circuitry 110 is configured to define one or more memory address spaces to allocate to the VM 106. Each memory address space, for example, represents at least a virtualized portion (e.g., one or more pages) of memory 116, registers and other storage locations of I/O devices, or both. For example, security circuitry 110 is configured to define a memory address space representing a virtualized portion (e.g., pages) of memory 116 and one or more registers of I/O device 120. Additionally, security circuitry 110 is configured to assign each defined memory address space a respective address space identifier (ASID). Such ASIDs, for example, each include data (e.g., a number of bits) indicating a unique identifier for a respective memory address space of the system. According to embodiments, security circuitry 110 ensures that two or more VMs 106 are not assigned the same (or overlapping) memory address spaces. In this way, multiple VMs 106 being executed by processor 102 each have access to memory 116, registers or other storage locations of I/O device, or both. According to embodiments, a hypervisor 108 is configured to maintain the mappings of the virtual memory addresses of the memory address spaces to physical memory addresses within memory 116, one or more I/O devices, or both. For example, hypervisor 108 maintains nested page tables 125 which includes page tables indicating the physical memory addresses of one or more virtual memory addresses. After allocating a memory address space to a VM 106, security circuitry 110 associates the VM 106 with the ASID of the memory address space allocated to the VM. For example, security circuitry 110 is configured to update a table (e.g., a memory ownership table mapping VMs to ASIDs, ASIDs to memory address spaces, or both) such that a VM 106 is associated with the ASID of the memory address space allocated to the VM.

To enhance processing efficiency, IOMMU 112 is generally configured to perform specified memory access operations on behalf of processor 102—that is, to perform memory access operations using hardware-based circuitry, software-based circuitry, or both of IOMMU 112, and without requiring management of the memory access operations by processor 102. In particular, IOMMU 112 includes hardware-based circuitry, software-based circuitry, or both configured to perform MMIO operations (e.g., fulfill MMIO requests), DMA operations (e.g., fulfill DMA requests), or both. In embodiments, processor cores (e.g., processor core 104), when executing one or more VMs 106, generate MMIO requests (e.g., MMIO request 122) on behalf of the VMs 106 to read data from I/O devices (e.g., I/O device 120), write data to I/O devices, or both. Further, in some embodiments, I/O devices (e.g., I/O device 120) are configured to generate MMIO requests (e.g., MMIO request 122) on behalf of the VMs 106 to read data from other I/O devices, write data to other I/O devices, or both. According to embodiments, each MMIO request 122 includes a descriptor indicating the memory addresses (e.g., physical memory addresses, virtual memory addresses) of a register or other storage location of the I/O device to be accessed. For example, the memory address of a register or other storage location from which data is to be read, the memory address of a register or other storage location where data is to be written, or both. Additionally, one or more I/O devices (e.g., I/O device 120) associated with one or more VMs 106, generate DMA requests (e.g., DMA request 123) on behalf of the VMs 106 to read data from memory 116, write data to memory 116, or both. According to embodiments, each DMA request 123 includes a descriptor indicating the virtual addresses of a register or other storage location of memory

116 to be accessed. IOMMU 112 is generally configured to translate the virtual addresses indicated by a DMA request 123 to physical addresses of the registers or other storage locations, and to interact with the I/O devices to carry out the one or more operations (read operations, write operations, or both) indicated by DMA request 123. Further, a memory management unit (MMU) (not shown for clarity) of processor 102 is configured to translate the virtual addresses indicated by a MMIO request 122 to physical addresses of the registers or other storage locations.

Because MMIO requests 122 and DMA requests 123 are, at least in some cases, executed independently of the operations of processor 102, MMIO requests 122 and DMA requests 123 provide an avenue for a malicious entity to access confidential information associated with VMs executing at processor 102. For example, regarding DMA requests 123, a malicious hypervisor could be configured to cause portions of DMA requests 123 issued on behalf of one or more VMs to fail by changing page table mappings (e.g., in nested page tables 125) related to the DMA requests 123 such that data requested in the DMA request 123 is selectively rerouted to an incorrect address (e.g., an address other than the address intended by the DMA request 123). As an example, if a VM 106 issues a DMA request 123 indicating a DMA transfer, the malicious hypervisor changes page tables in nested page tables 125 associated with the virtual address indicated in the DMA request 123 (e.g., the target address for the DMA transfer). IOMMU 112 then translates the virtual address indicated in the DMA request 123 based on the changed page table mapping such that the requested data is rerouted to a changed address (e.g., an address other than the intended address). Such behaviors by a malicious hypervisor are used to potentially identify confidential information associated with VM 106. As another example, regarding MMIO requests 122, a malicious hypervisor is configured to modify page table mappings in, for example, nested page tables 125 to block one or more MMIO requests 122. To this end, the malicious hypervisor is configured to unmap one or more I/O buffers relating to an MMIO request 122 while still allowing data indicating the completion of the MMIO request 122 (e.g., a completion write flag, write-to-buffer completion flag) to be written. The data indicating the completion of the MMIO request indicates to the VM 106 associated with the MMIO request 122 that the MMIO request 122 was completed even though the I/O buffers were unmapped and the MMIO request 122 was not actually completed. As such, the VM 106 associated with the MMIO request 122 reads stale data from the I/O buffers rather than the intended data (e.g., the data indicated in the MMIO request 122), potentially exposing such data to unwanted entities such as the malicious hypervisor, malicious VMs, or both. In this way, the malicious hypervisor blocks MMIO requests 122 associated with one or more VMs 106 by unmapping the I/O buffers associated with the MMIO request 122.

To address these potential vulnerabilities, IOMMU 112 maintains ASID mask table 114 that indicates, for each VM 106, one or more ASIDs associated with (e.g., allocated to) the VM 106. That is to say, to address potential vulnerabilities, processing system 100 includes ASID mask table 114 stored in, for example, memory 116, that is maintained by IOMMU 112. The ASID mask table 114 includes one or more entries each associated with an ASID assigned to a respective VM 106. Each entry, for example, includes a field identifying an ASID assigned to a respective VM and a security indicator field associated with the ASID. The security indicator field includes, for example, data (e.g., a number of bits) indicating whether a VM 106 associated with the ASID was a target of an attack by, for example, a malicious hypervisor, whether MMIO requests 122 associated with the VM 106 are to be allowed, whether DMA requests 123 associated with the VM 106 are to be allowed, or any combination thereof. For example, the security indicator field includes a first bit indicating whether MMIO requests 122 associated with the VM 106 are to be allowed and a second bit indicating whether DMA requests 123 associated with the VM 106 are to be allowed. To set such data in a security indicator field, IOMMU 112 first detects a transfer failure (e.g., page fault). For example, in response to a malicious hypervisor changing the page table mapping in nested pages tables 125 for a virtual address associated with a DMA request 123 provided to IOMMU 112, a block of data will be misdirected to the changed address. Due to such a misdirection, a transfer failure (e.g., page fault) will occur as the data was not transferred to the correct address (e.g., originally indicated address). As another example, in response to a malicious hypervisor changing page table mappings in nested page tables 125 to unmap one or more I/O buffers associated with a MMIO request 122 while still allowing data (e.g., completion flag) indicating the MMIO request 122 was completed, the MMIO request 122 is blocked and the VM 106 associated with the MMIO request 122 will read stale data from the I/O buffers as no data was written to them. Because the MMIO request 122 was blocked, a transfer failure (e.g., page fault) will occur due to the I/O buffers being unmapped and stale data being read.

In response to such transfer failures due to an MMIO of DMA request, IOMMU 112 determines (e.g., based on a descriptor included with the MMIO request or DMA request, a mapping of VMs 106 to memory address spaces, a memory ownership table mapping VMs to ASIDs, ASIDs to memory address spaces, or both) the VM 106 that is associated with the MMIO or DMA request (e.g., the VM that initiated the MMIO or DMA request or the VM 106 that is the target of data indicated in the MMIO or DMA request). For example, in some embodiments, memory 116 includes a mapping table indicating sets of assigned memory addresses to VMs 106 (e.g., VM identifiers) as disclosed in the commonly owned and related U.S. Patent Application entitled "SECURE MEMORY-MAPPED INPUT/OUTPUT" and filed on the same day as the present application, the relevant portions of which pertaining to the mapping table being incorporated by reference herein. Using such a mapping table, IOMMU 112 is configured to determine a VM 106 associated with an MMIO or DMA request based on the memory addresses indicated in the MMIO or DMA request. After determining the VM 106 that is associated with the MMIO or DMA request, IOMMU 112 updates the security indicator field associated with the ASID assigned to the VM 106 in ASID mask table 114. For example, IOMMU 112 sets one or more bits in a security indicator field associated with the ASID such that the security indicators indicate that the VM 106 was a target of an attack, MMIO requests 122 associated with the VM 106 are not to be performed, DMA requests 123 associated with the VM 106 are not to be performed, or any combination thereof. That is to say, IOMMU 112 sets bits in the security indicator field associated with the ASID such that the security indicator field indicates that a transfer failure caused by an MMIO or DMA request associated with the VM 106 occurred, MMIO requests 122 associated with the VM 106 are not to be performed, DMA requests 123 associated with the VM 106 are not to be performed, or any combination thereof.

Further, IOMMU 112 is configured to perform (e.g., execute) received MMIO requests and DMA requests based on ASID masking table 114. For example, in response to receiving an MMIO request or DMA request, IOMMU 112 is configured to determine the VM 106 that is associated with the MMIO or DMA request (e.g., the VM that initiated the MMIO or DMA request or the VM 106 that is the target of data indicated in the MMIO or DMA request). As an example, using a mapping table indicating sets of assigned memory addresses to VMs 106, IOMMU 112 is configured to determine a VM 106 associated with an MMIO or DMA request based on the memory addresses indicated in the MMIO or DMA request. After determining the VM 106 associated with the MMIO or DMA request, IOMMU 112 then checks ASID mask table 114. For example, IOMMU 112 checks one or more bits of a security indicator field associated with the ASID assigned to the VM 106 in ASID mask table 114. In response to one or more bits of a security indicator field associated with the ASID assigned to the VM 106 indicating MMIO requests 122 are not to be performed, DMA requests 123 are not to be performed, or both, IOMMU 112 denies the received MMIO or DMA request, respectively, and does not execute the MMIO or DMA request (e.g., does not translate the addresses indicated in a DMA request, does not write data indicating the completion of an MMIO or DMA request). Further, in response to bits of a security indicator field associated with an ASID assigned to the VM 106 indicating MMIO requests 122 are to be performed, DMA requests 123 are to be performed, or both, IOMMU 112 performs (e.g., executes) the received MMIO or DMA request, respectively. In this way, IOMMU 112 helps ensure that an MMIO or DMA request is only satisfied if the VM 106 associated with the MMIO or DMA request has not been attacked by a malicious hypervisor (e.g., no transfer failures were caused by MMIO or DMA requests associated with the VM 106). As such, IOMMU 112 helps prevent the malicious hypervisor and malicious VMs from accessing confidential VM information via an MMIO or DMA request.

Figure 2:
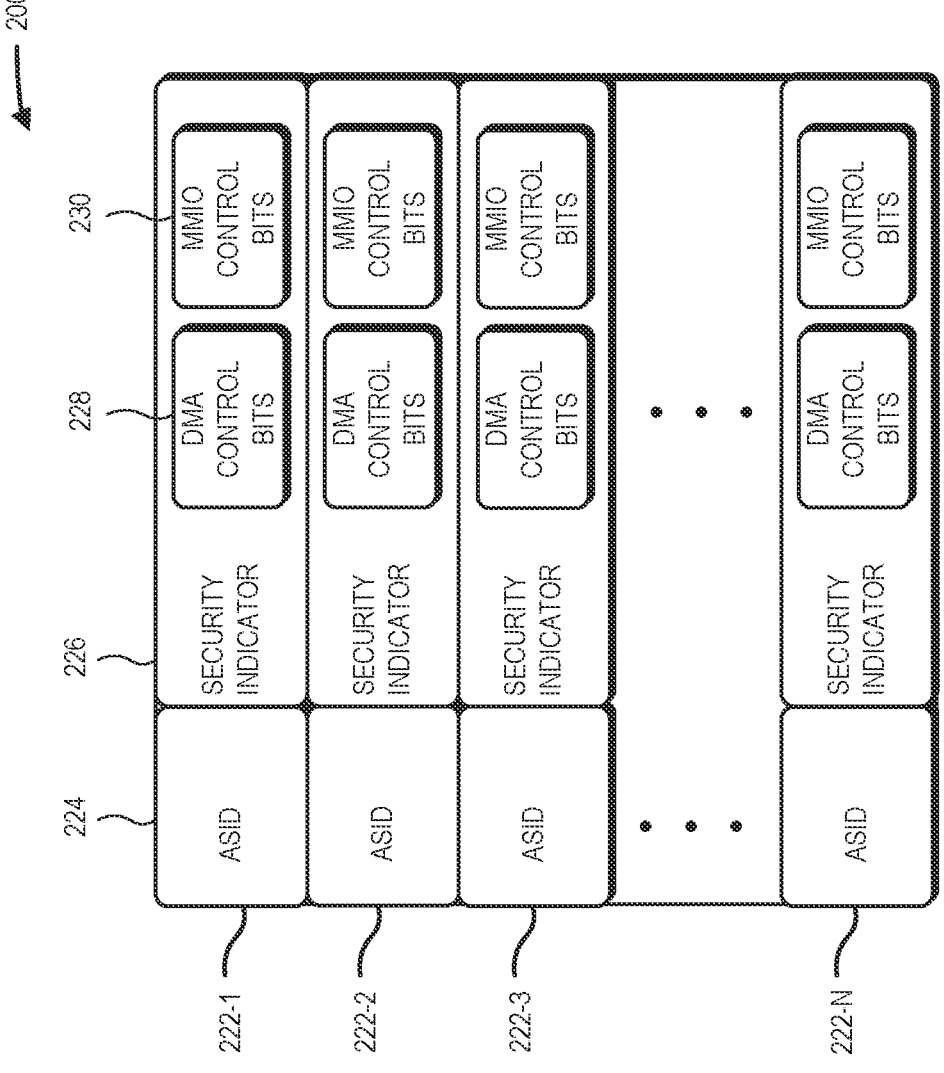
FIG. 2 is a block diagram of an example address space identifier (ASID) mask table used to manage MMIO requests, DMA requests, or both based on security indicator fields, in accordance with some embodiments.

FIG. 2 illustrates an example ASID mask table 200 used to manage MMIO requests, DMA requests, or both, in accordance with some embodiments. In the example embodiment, ASID mask table 200, similar to or the same as ASID mask table 114, includes a plurality of entries 222 with each entry 222 corresponding to a respective ASID (e.g., ASID assigned to a respective VM 106). For example, ASID mask table 200 includes a plurality of entries 222 with each entry corresponding to an ASID assigned to a respective VM 106 that is currently executing at processor 102, a VM 106 expected to be executed at processor 102 (e.g., a VM that has undergone a VM provisioning process at the processing system 100), or both, to name a couple. Though the example embodiment of FIG. 2 presents ASID mask table 200 as having four entries (e.g., 222-1, 222-2, 222-3, 222-N) representing an N number of entries 222, in other embodiments ASID mask table 200 may include any number of entries. As an example, ASID mask table 200 includes an entry 222 for each ASID assigned to a VM 106 that is currently executing at processor 102, each VM 106 expected to be executed at processor 102, or both.

In embodiments, each entry 222 of ASID mask table 200 includes a plurality of fields, for example, an ASID field 224, security indicator field 226, or both. An ASID field 224 indicates an ASID corresponding to the memory address spaces allocated to, for example, a VM 106 that is currently executing at processor 102, a VM 106 expected to be executed at processor 102, or both. For example, in preparation for processor 102 launching a VM 106, security circuitry 110 is configured to define a memory address space to allocate to the VM 106. Security circuitry 110 defines the memory address spaces based on, for example, memory 116, registers and other storage locations of I/O devices (e.g., I/O device 120), or both and assigns a respective ASID to the memory address space. Such an ASID, for example, includes a unique identifier for the memory address space. During a provisioning process of a VM 106, security circuitry 110 then allocates the defined memory address space to the respective VM 106. Security circuitry 110 then updates a table (e.g., a memory ownership table mapping VMs to ASIDs, ASIDs to memory address spaces, or both) such that a VM 106 is associated with the ASID of the memory address space allocated to the VM 106. In embodiments, such ASIDs assigned to respective VMs 106 are reflected in respective ASID fields 224.

According to embodiments, the security indicator field 226 of an entry 222 indicates whether the VM associated with the ASID identified in the ASID field 224 of the entry 222 was a target of an attack, whether DMA requests 123 associated with the ASID are to be performed, whether MMIO requests 122 associated with the ASID are to be performed, or any combination thereof. To this end, each security indicator field 226 includes one or more DMA control bits 228 and one or more MMIO control bits 230. Such DMA control bits 228, for example, indicate whether the VM 106 associated with the ASID in the ASID field 224 of the entry was the target of an attack, whether DMA requests 123 associated with the ASID (e.g., VM 106 assigned to the ASID) are to be performed, or both. MMIO control bits 230, for example, indicate whether the VM 106 associated with the ASID in the ASID field 224 of the entry was the target of an attack, whether MMIO requests 122 associated with the ASID (e.g., VM 106 assigned to the ASID) are to be performed, or both.

In embodiments, one or more bits of DMA control bits 228, MMIO control bits 230, or both are initialized to indicate that a corresponding VM was not a target of an attack, DMA requests 123 are to be performed, MMIO requests 122 are to be performed, or any combination thereof. According to embodiments, when, for example, a malicious hypervisor selectively reroutes, blocks, or both one or more MMIO requests 122, DMA requests 123, or both provided to IOMMU 112, one or more transfer failures (e.g., page faults) will occur. For example, in response to a malicious hypervisor changing the page mapping associated with a block of data indicated in a DMA request 123, IOMMU 112 translates virtual addresses based on the changed page table mapping to produce a changed address. As such, the block of data indicated in the DMA request 123 will be misdirected to the changed address and a transfer failure (e.g., page fault) will occur. As another example, in response to a malicious hypervisor changing a page table mapping to unmap one or more I/O buffers associated with an MMIO request 122 while still allowing data (e.g., a completion flag) indicating the MMIO request 122 was completed to be written, a VM 106 associated with the MMIO request 122 will read stale data from the I/O buffers. Due to the VM 106 reading stale data and the I/O buffers being unmapped, a transfer failure will occur. In response to determining a transfer failure has occurred, IOMMU 112 is configured to abort the MMIO or DMA request currently being performed, determine (e.g., based on a descriptor included with the received MMIO request 122 or DMA request 123, a mapping table indicating sets of assigned memory addresses to VMs 106, a memory ownership table mapping VMs to ASIDs, ASIDs to memory address spaces, or both, or any combination thereof) the VM that is associated with the MMIO or DMA request that caused the transfer failure (e.g., the VM that initiated the MMIO or DMA request or the VM that is the target of data indicated in the MMIO or DMA request), or both. IOMMU 112 then updates a security indicator field 226 in the entry 222 corresponding to the ASID allocated to the VM associated with the MMIO or DMA request that caused the transfer failure to indicate that the VM was a target of an attack, one or more MMIO requests are not to be performed, one or more DMA requests are not to be performed, or any combination thereof. For example, IOMMU 112 updates DMA control bits 228 to indicate one or more DMA requests 123 are not to be performed, MMIO control bits 230 to indicate one or more MMIO requests 122 are not to be performed, or both.

According to embodiments, IOMMU 112 is configured to update one or more DMA control bits 228 to indicate one or more types of DMA requests 123 are not to be performed. For example, IOMMU 112 is configured to update DMA control bits 228 to indicate that all DMA requests 123 (e.g., associated with the ASID identified in the entry 222) are to be blocked, DMA requests 123 (e.g., associated with the ASID identified in the entry 222) from a root complex of processing system 100 are to be blocked, DMA requests 123 (e.g., associated with the ASID identified in the entry 222) from one or more specific I/O devices (e.g., I/O device 120) are to be blocked, or any combination thereof. For example, based on one or more memory addresses identified by a DMA request 123 that causes a transfer failure, IOMMU 112 is configured to update DMA control bits 228 to indicate that all DMA requests 123 are to be blocked, DMA requests 123 from a root complex of processing system 100 are to be blocked, DMA requests 123 from one or more specific I/O devices (e.g., I/O device 120) are to be blocked, or any combination thereof. In embodiments, IOMMU 112 is configured to update one or more MMIO control bits 230 to indicate one or more types of MMIO requests 122 are not to be performed. For example, IOMMU 112 is configured to update MMIO control bits 230 to indicate that all MMIO requests 122 (e.g., associated with the ASID identified in the entry 222) are to be blocked, MMIO requests 122 (e.g., associated with the ASID identified in the entry 222) from one or more specific I/O devices (e.g., I/O device 120) are to be blocked, or both. For example, based on one or more memory addresses identified by an MMIO request 122 that causes a transfer failure, IOMMU 112 is configured to update MMIO control bits 230 to indicate that all MMIO requests 122 are to be blocked, MMIO requests 122 from one or more specific I/O devices (e.g., I/O device 120) are to be blocked, or both.

Figure 3:
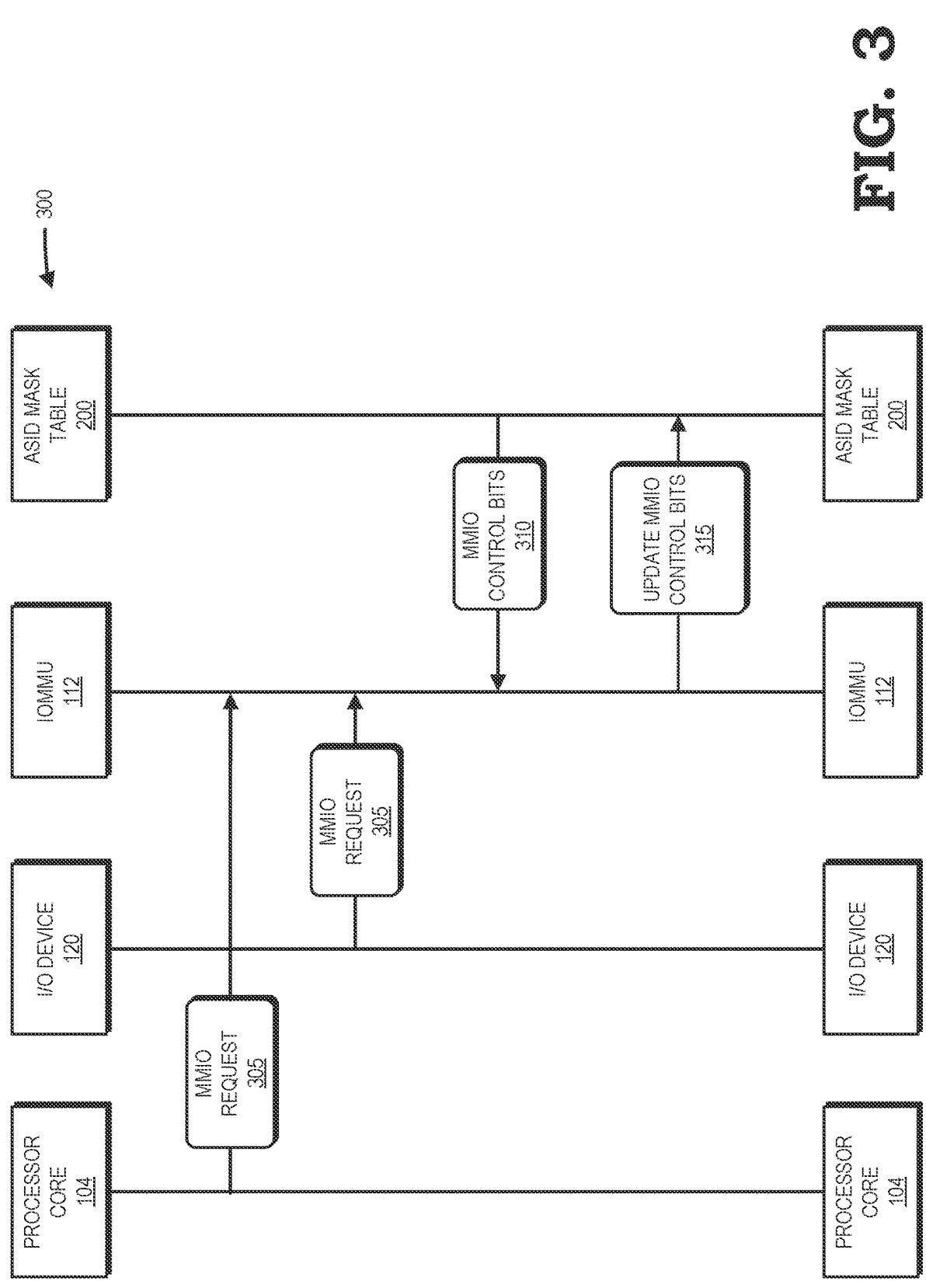
FIG. 3 is a signal flow diagram of an example operation for setting MMIO control bits in a security indicator field, in accordance with some embodiments.

Referring now to FIG. 3, an example operation 300 for setting MMIO control bits 230 in a security indicator field 226 is presented, in accordance with some embodiments. In embodiments, example operation 300 includes a processor core 104 or I/O device 120 issuing an MMIO request 305, similar to or the same as MMIO request 122, to IOMMU 112. MMIO request 305, for example, includes data indicating a request, from a VM, to read data from I/O devices (e.g., I/O device 120), write data to I/O devices, or both. In response to receiving MMIO request 305, IOMMU 112 checks one or more MMIO control bits 310, similar to or the same as MMIO control bits 230, from respective entries 222 in ASID mask table 200. For example, IOMMU 112 checks one or more MMIO control bits 310 in a security indicator field 226 in an entry 222 of ASID mask table 200 corresponding to the ASID (e.g., the ASID identified in the corresponding ASID field 224) allocated to the VM that issued the MMIO request 305, the VM that is a target of the MMIO request 305, or both. In response to the MMIO control bits 310 indicating that a corresponding VM was a target of an attack, that all MMIO requests associated with the ASID (e.g., the VM assigned to the ASID) are not to be performed, one or more types of MMIO requests (e.g., MMIO requests from certain I/O devices 120) associated with the ASID are not to be performed, or any combination thereof, IOMMU 112 denies the MMIO request 305 by, for example, not writing data (e.g., a completion flag) indicating the MMIO request 305 was completed. Additionally, in response to the MMIO control bits 310 indicating that a corresponding VM was not a target of an attack, that all MMIO requests associated with the ASID (e.g., the VM assigned to the ASID) are to be performed, one or more types of MMIO requests (e.g., MMIO requests from certain I/O devices 120) associated with the ASID are to be performed, or any combination thereof, IOMMU 112 completes the MMIO request 305.

In embodiments, the processing system issuing MMIO request 305 includes a malicious hypervisor. In such embodiments, the malicious hypervisor changes the page table mapping (e.g., changes page tables in nested page tables 125) associated with the I/O buffers associated with the MMIO request 305 provided to IOMMU 112. For example, the malicious hypervisor changes the page table mapping to unmap the I/O buffers while still allowing data (e.g., a completion flag) indicating the MMIO request 305 was completed to be written. Because the I/O buffers were unmapped, the MMIO request 305 is blocked and the VM associated with the MMIO request 305 reads stale data from the I/O buffers, causing a transfer failure to occur. In response to such a transfer failure, IOMMU 112 determines (e.g., based on a descriptor included with the MMIO request 305, a mapping of VMs 106 to memory address spaces, a memory ownership table mapping VMs to ASIDs, ASIDs to memory address spaces, or both, or any combination thereof) the VM that is associated with MMIO request 305 (e.g., the VM that initiated MMIO request 305 or the VM that is the target of data indicated in MMIO request 305). In response to determining the VM associated with MMIO request 305, IOMMU 112 performs update MMIO control bits operation 315. Update MMIO control bits operation 315, for example, first includes IOMMU 112 aborting the current MMIO request (e.g., MMIO request 305) or DMA request being performed by IOMMU 112. Next, update MMIO control bits operation 315 includes IOMMU 112 updating the MMIO control bits 310 in entries 222 of ASID mask table 200 corresponding to the determined VM (e.g., the ASID associated with the VM identified in the ASID field 224 of the corresponding entry 222) to indicate that the determined VM was a target of an attack, all MMIO requests associated with the ASID (e.g., the ASID assigned to the VM) are not to be performed, one or more types of MMIO requests (e.g., MMIO requests from certain I/O devices) associated with the ASID are not to be performed, or any combination thereof. For example, IOMMU 112 updates one or more bits of MMIO control bits 310 to indicate that all MMIO requests associated with the determined VM (e.g., the ASID assigned to the VM) are not to be performed. As another example, IOMMU 112 is configured to determine a type of the MMIO request 305 based on one or more memory addresses indicated in MMIO request 305. For example, IOMMU 112 determines which I/O device the MMIO request 305 is from. In response to determining which I/O device the MMIO request is from, IOMMU 112 updates one or more bits of MMIO control bits 310 to indicate that MMIO requests from the determined I/O device associated with a respective VM (e.g., the ASID allocated to the VM) are not to be performed.

Figure 4:
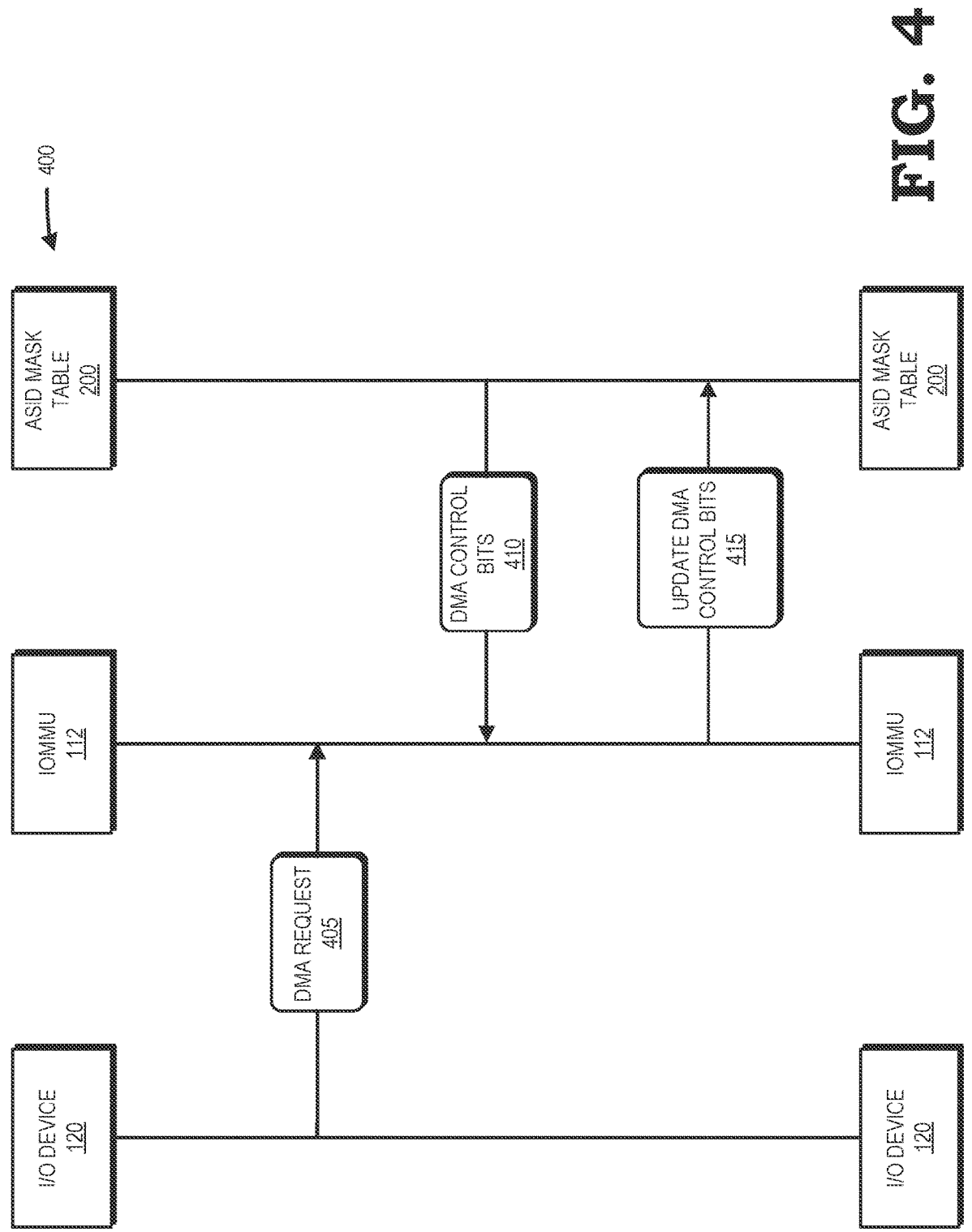
FIG. 4 is a signal flow diagram of an example operation for setting DMA control bits in a security indicator field, in accordance with some embodiments.

Referring now to FIG. 4, an example operation 400 for setting DMA control bits in a security indicator field 226 is presented, in accordance with some embodiments. In embodiments, example operation 400 includes an I/O device 120 issuing a DMA request 405, similar to or the same as DMA request 123, to IOMMU 112. DMA request 405, for example, includes data indicating a request, from a VM, to read data from a memory (e.g., memory 116) of processing system 100, write data to a memory (e.g., memory 116) of processing system 100, or both. In response to receiving DMA request 405, IOMMU 112 checks one or more DMA control bits 410, similar to or the same as DMA control bits 228, from respective entries 222 in ASID mask table 200. For example, IOMMU 112 checks one or more DMA control bits 410 in a security indicator field 226 in an entry 222 of ASID mask table 200 corresponding to the ASID (e.g., the ASID identified in the corresponding ASID field 224) allocated to the VM that issued the DMA request 405, the VM that is a target of the DMA request 405, or both. In response to the DMA control bits 410 indicating that a corresponding VM was a target of an attack, that all DMA requests associated with the ASID (e.g., the VM assigned to the ASID) are not to be performed, one or more types of DMA requests (e.g., DMA requests from a root complex of processing system 100, DMA requests from certain I/O devices 120) associated with the ASID are not to be performed, or any combination thereof, IOMMU 112 denies the DMA request 405 by, for example, not translating the virtual memory addresses indicated in DMA request 405. Additionally, in response to the DMA control bits 410 indicating that a corresponding VM was not a target of an attack, that all DMA requests associated with the ASID (e.g., the VM assigned to the ASID) are to be performed, one or more types of DMA requests (e.g., DMA requests from a root complex of processing system 100, DMA requests from certain I/O devices 120) associated with the ASID are to be performed, or any combination thereof, IOMMU 112 completes the DMA request 405.

According to embodiments, the processing system issuing DMA request 405 includes a malicious hypervisor. In such embodiments, the malicious hypervisor changes the page table mapping (e.g., changes page tables in nested page tables 125) associated with the data blocks (e.g., virtual memory addresses) indicated in DMA request 405 provided to IOMMU 112. For example, the malicious hypervisor changes the page table mapping to selectively reroute data blocks indicated in DMA request 405 to one or more changed memory addresses (e.g., memory addresses modified from the memory addresses indicated in DMA request 405). Because the data blocks were redirected to the changed memory addresses, a transfer failure (e.g., page fault) occurs. In response to such a transfer failure caused by DMA request 405, IOMMU 112 determines which VM being executed by processing system 100 is associated with DMA request 405. That is to say, IOMMU 112 determines the VM that initiated DMA request 405 or the VM that is the target of data indicated in DMA request 405. In embodiments, IOMMU 112 is configured to determine which VM is associated with DMA request 405 based on, for example, a descriptor included with the DMA request 405, a mapping of VMs 106 to memory address spaces, a memory ownership table mapping VMs to ASIDs, a memory ownership table mapping ASIDs to memory address spaces, or any combination thereof. After determining which VM is associated with DMA request 405, IOMMU 112 performs update DMA control bits operation 415. Update DMA control bits operation 415, for example, first includes IOMMU 112 aborting the current MMIO request or DMA request (e.g., DMA request 405) being performed by IOMMU 112. Next, update DMA control bits operation 415 includes IOMMU 112 updating the DMA control bits 410 in entries 222 of ASID mask table 200 corresponding to the determined VM (e.g., the ASID associated with the VM identifying in the ASID field 224 of the corresponding entry 222) to indicate that the determined VM was a target of an attack, all DMA requests associated with the ASID (e.g., the ASID assigned to the VM) are not to be performed, one or more types of DMA requests (e.g., DMA requests from a root complex of processing system 100, DMA requests from certain I/O devices) associated with the ASID are not to be performed, or any combination thereof. For example, IOMMU 112 updates one or more bits of DMA control bits 410 to indicate that all DMA requests associated with the determined VM (e.g., the ASID assigned to the VM) are not to be performed. As another example, IOMMU 112 is configured to determine a type of DMA request 405 based on one or more memory addresses indicated in DMA request 405. For example, IOMMU 112 determines which I/O device the DMA request 405 is from or if the DMA request 405 is from a root complex of processing system 100. In response to determining which I/O device the DMA request is from, IOMMU 112 updates one or more bits of DMA control bits 410 to indicate that DMA requests from the determined I/O device associated with a respective VM (e.g., the ASID allocated to the VM) are not to be performed. Similarly, in response to determining that the DMA request is from a root complex of processing system 100, IOMMU 112 updates one or more bits of DMA control bits 410 to indicate that DMA requests from the root complex of processing system 100 associated with a respective VM (e.g., the ASID allocated to the VM) are not to be performed.

Figure 5:
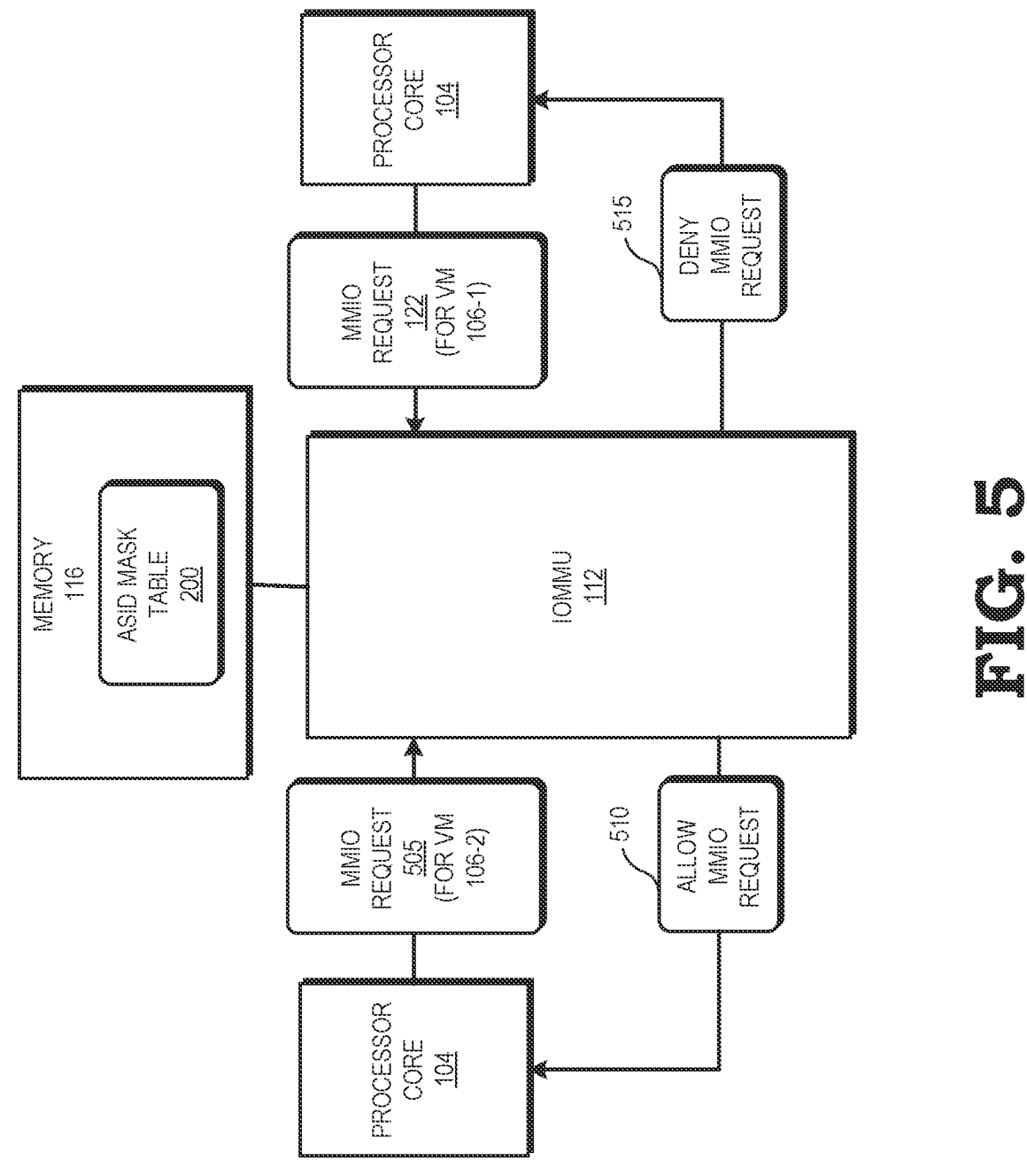
FIG. 5 is a block diagram illustrating an example of the IOMMU of FIG. 1 managing MMIO requests for multiple virtual machines based on one or more security indicator fields, in accordance with some embodiments.

As noted above, ASID mask table 200 stores individual entries for each ASID of VMs that are executing at the processor 102. This allows the IOMMU 112 to allow or deny MMIO requests for different VMs on an individual basis, independent of the MMIO requests for other VMs. An example embodiment is illustrated at FIG. 5. In the example embodiment of FIG. 5, it is assumed that processor 102 is executing two different VMs: VM 106-1 and VM 106-2. The IOMMU 112 receives MMIO request 122 from processor core 104, indicating a request to access a register or other storage location of an I/O device on behalf of VM 106-1. It is further assumed that ASID mask table 200 includes one or more MMIO control bits 230 (e.g., in a security indicator field 226 associated with an ASID that is associated with VM 106-1) indicating that VM 106-1 was a target of an attack (e.g., was associated with an MMIO request that caused a transfer failure), all MMIO requests associated with VM 106-1 are not to be performed, one or more types of MMIO requests (e.g., MMIO requests from certain I/O devices) associated with VM 106-1 are not to be allowed, or any combination thereof. Accordingly, based on MMIO control bits 230, the IOMMU 112 prevents execution of MMIO request 122 (e.g., by not writing data indicating MMIO request 122 was completed) and indicates to processor core 104 (via message 515) that MMIO request 122 has been denied.

With respect to MMIO request 505, it is assumed that the ASID mask table 200 includes one or more bits of MMIO control bits 230 (e.g., in a security indicator field 226 associated with an ASID that is associated with VM 106-2) indicating that VM 106-2 was not the target of an attack (e.g., is not associated with an MMIO that caused a transfer failure), all MMIO requests associated with VM 106-2 are to be performed, one or more types of MMIO requests (e.g., MMIO requests from certain I/O devices) associated with VM 106-2 are to be performed, or any combination thereof. Accordingly, based on MMIO control bits 230, IOMMU 112 determines that MMIO request 505 is allowed (as indicated by message 510 to processor core 104), and therefore executes MMIO request 505. Thus, in the example of FIG. 5, IOMMU 112 selectively allows some MMIO requests and denies others based on previous attacks on VMs by, for example, a malicious hypervisor. As such, the malicious hypervisor, a malicious VM, or both are prevented from accessing confidential information of the VMs running on processing system 100 due to, for example, a malicious hypervisor changing page table mappings to unmap I/O buffers associated with MMIO requests.

Figure 6:
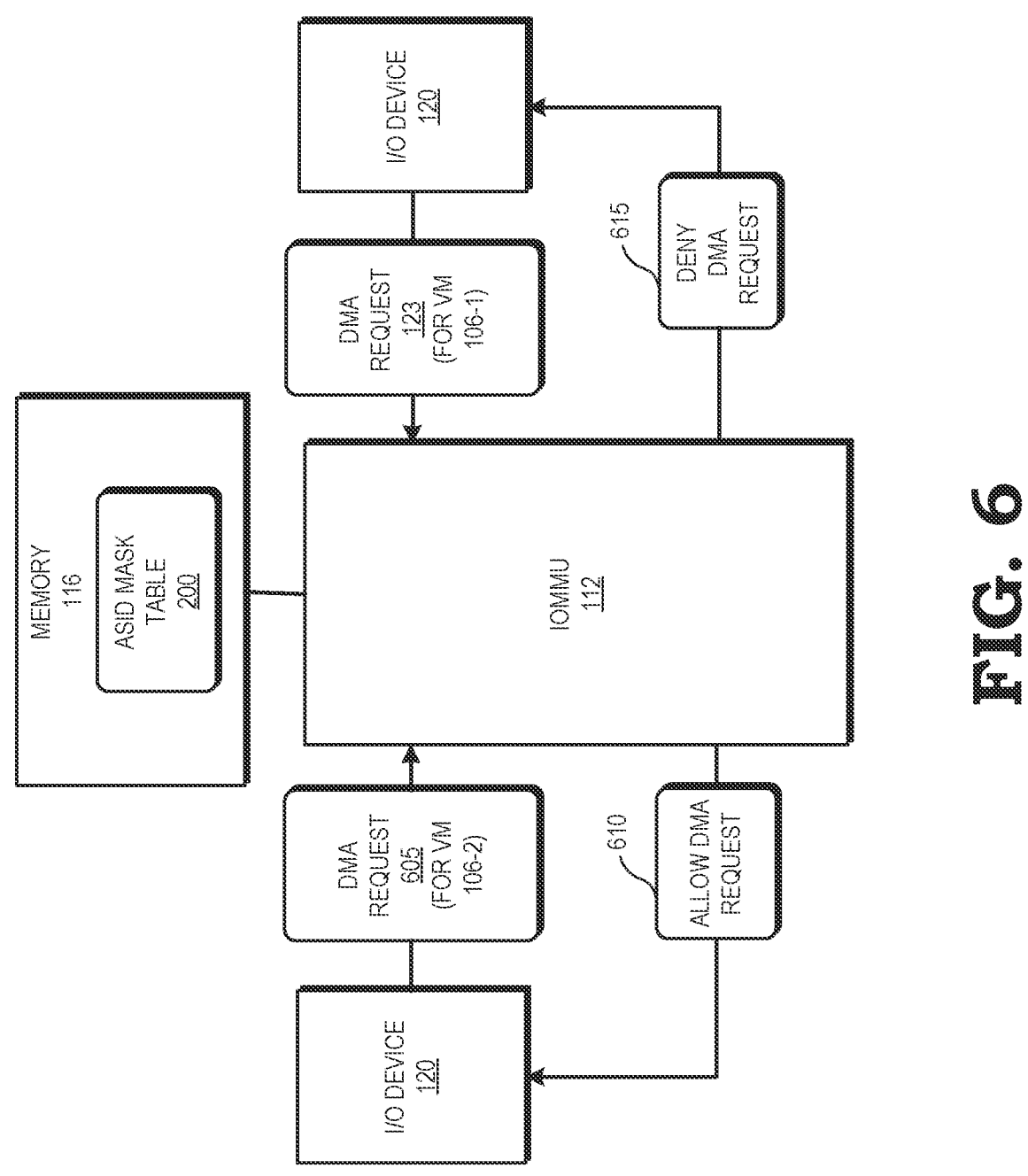
FIG. 6 is a block diagram illustrating an example of the IMMOU of FIG. 1 managing DMA requests for multiple virtual machines based on one or more security indicator fields, in accordance with some embodiments.

Similarly, an example embodiment is illustrated at FIG. 6. In the example embodiment of FIG. 6, it is assumed that processor 102 is executing two different VMs: VM 106-1 and VM 106-2. The IOMMU 112 receives DMA request 123 from I/O device 120, indicating a request to access memory 116 on behalf of VM 106-1. It is further assumed that ASID mask table 200 includes one or more DMA control bits 228 (e.g., in a security indicator field 226 associated with an ASID that is associated with VM 106-1) indicating that VM 106-1 was a target of an attack (e.g., was associated with a DMA request that caused a transfer failure), all DMA requests associated with VM 106-1 are not to be performed, one or more types of DMA requests (e.g., DMA requests from a root complex of processing system 100, DMA requests from certain I/O devices) associated with VM 106-1 are not to be performed, or any combination thereof. Accordingly, based on DMA control bits 228, the IOMMU 112 prevents execution of DMA request 123 (e.g., by not translating the virtual address indicted in DMA request 123) and indicates to I/O device 120 (via message 615) that DMA request 123 has been denied.

With respect to DMA request 605, it is assumed that the ASID mask table 200 includes one or more bits of DMA control bits 228 (e.g., in a security indicator field 226 associated with an ASID that is associated with VM 106-2) indicating that VM 106-2 was not the target of an attack (e.g., is not associated with a DMA request that caused a transfer failure), all DMA requests associated with VM 106-2 are to be performed, one or more types of DMA requests (e.g., DMA requests from a root complex of processing system 100, DMA requests from certain I/O devices) associated with VM 106-2 are to be performed, or any combination thereof. Accordingly, based on DMA control bits 228, IOMMU 112 determines that DMA request 605 is allowed (as indicated by message 610 to I/O device 120), and therefore executes DMA request 605. Thus, in the example of FIG. 6, IOMMU 112 selectively allows some DMA requests and denies others based on previous attacks on VMs by, for example, a malicious hypervisor. As such, the malicious hypervisor, malicious VMs, or both are prevented from accessing confidential information of the VMs running on processing system 100 due to, for example, a malicious hypervisor changing page table mappings.

Figure 7:
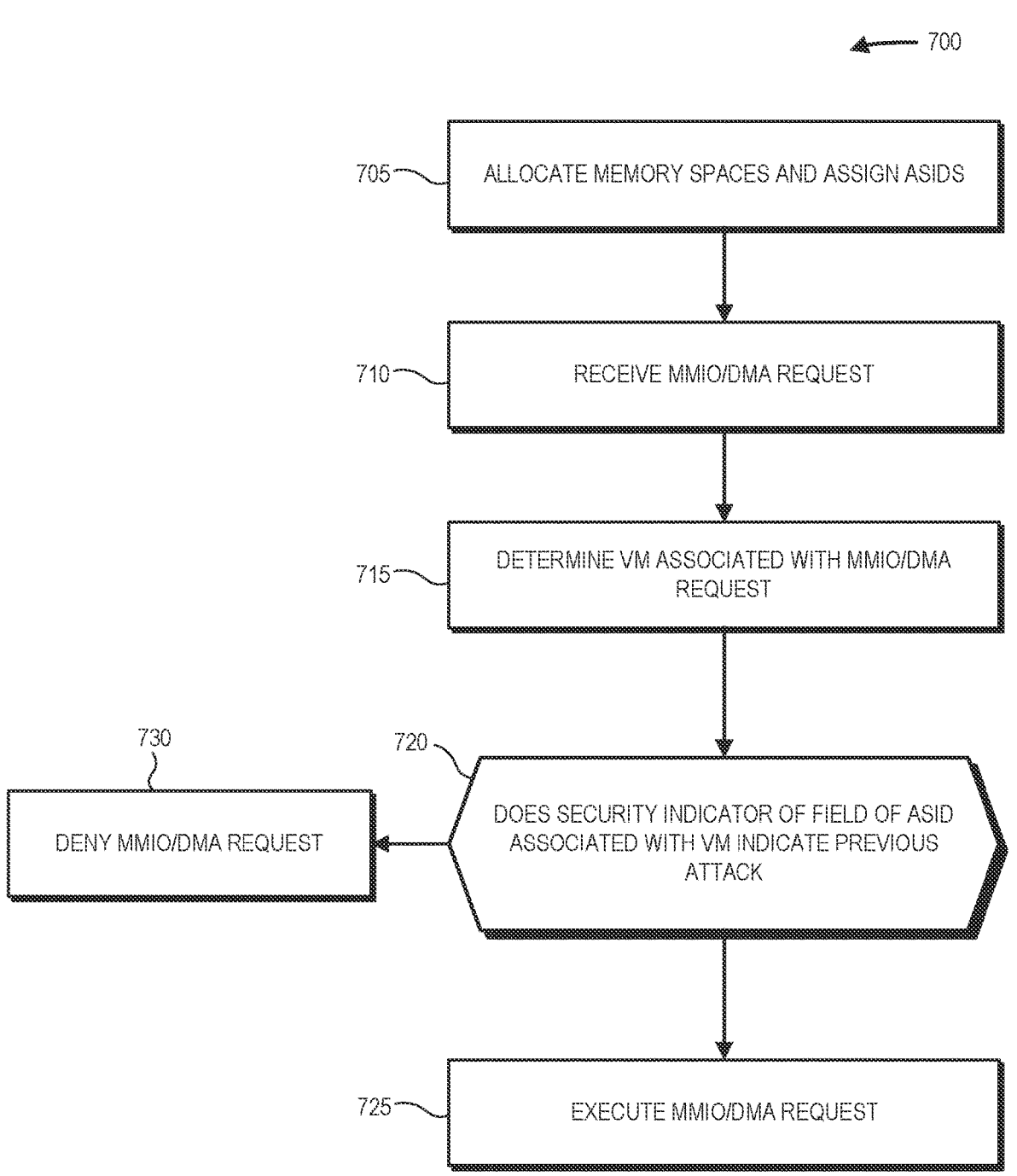
FIG. 7 is a flow diagram illustrating an example method for managing MMIO access, DMA requests, or both for multiple virtual machines based on one or more security indicator fields, in accordance with some embodiments.

Referring now to FIG. 7, an example method 700 for managing secure MMIO and DMA access at an IMMOU is presented. For purposes of description, the method 700 is described with respect to an example implementation at the processing system 100 of FIG. 1, but it will be appreciated that in other embodiments the method 700 is implemented at processing systems having different configurations. At step 705, security circuitry 110 defines a memory address space to allocate to a VM based on, for example, memory 116, registers and other storage locations of I/O devices (e.g., I/O device 120), or both. For example, in preparation for processor 102 launching VM 106, security circuitry 110 defines a memory address space representing distinct virtualized portions (e.g., pages) of memory 116, registers and other storage locations of I/O devices (e.g., I/O device 120), or both. Further, security circuitry 110 assigns a respective ASID to the memory address space that includes a unique identifier for the memory address space. In response to security circuitry 110 allocating a memory address space to VM 106, security circuitry 110 associates VM 106 with the ASID of the memory address space allocated to the VM. For example, security circuitry 110 is configured to update a table (e.g., a memory ownership table mapping VMs to ASIDs, ASIDs to memory address spaces, or both) such that VM 106 is associated with the ASID of the memory address space allocated to VM 106.

At step 710, IOMMU 112 receives MMIO request 122 from, for example, processor core 104 or I/O device 120, DMA request 123 from, for example, I/O device 120, or both. MMIO request 122 and DMA request 123 each include data indicating the virtual memory addresses targeted by the request. At step 715, IOMMU 112 determines the VM associated with MMIO request 122 or DMA request 123 (e.g., based on a descriptor included with the DMA request 405, a mapping of VMs 106 to memory address spaces, a memory ownership table mapping VMs to ASIDs, ASIDs to memory address spaces, or both, or any combination thereof). That is to say, IOMMU 112 determines the VM that issued MMIO request 122 or DMA request 123, the VM that is a target of MMIO request 122 or DMA request 123, or both. At step 720, IOMMU 112 determines whether the security indicator field 226 of an entry 222 associated with the ASID allocated to the determined VM in ASID mask table 200 indicates that the VM was a target of an attack, by, for example, a malicious hypervisor, all MMIO requests associated with the VM are to be performed, all DMA requests associated with the VM are to be performed, one or more types of MMIO requests (e.g., MMIO requests from certain I/O devices) associated with the VM are to be performed, one or more types of DMA requests (e.g., DMA requests from a root complex of processing system 100, DMA requests from certain I/O devices) associated with the VM are to be performed, or any combination thereof. For example, IOMMU 112 checks one or more bits of DMA control bits 228, MMIO control bits 230, or both in the security indicator field 226 of the entry 222 associated with the ASID allocated to the determined VM. In response to one or more bits of DMA control bits 228, MMIO control bits 230, or both indicating that the VM was not a target of an attack, all MMIO requests associated with the VM are to be performed, all DMA requests associated with the VM are to be performed, one or more types of MMIO requests (e.g., MMIO requests from certain I/O devices) associated with the VM are to be performed, one or more types of DMA requests (e.g., DMA requests from a root complex of processing system 100, DMA requests from certain I/O devices) associated with the VM are to be performed, or any combination thereof, respectively, the system moves to step 725.

At step 725, IOMMU 112 executes the received MMIO request 122 or DMA request 123 and reports the execution to processor core 104 or I/O device 120, respectively.

Referring again to step 720, in response to one or more bits of DMA control bits 228, MMIO control bits 230, or both indicating that the VM was a target of an attack, all MMIO requests associated with the VM are not to be performed, all DMA requests associated with the VM are not to be performed, one or more types of MMIO requests (e.g., MMIO requests from certain I/O devices) associated with the VM are not to be performed, one or more types of DMA requests (e.g., DMA requests from a root complex of processing system 100, DMA requests from certain I/O devices) associated with the VM are not to be performed, or any combination thereof, respectively, the system moves to step 730. At step 730, IOMMU 112 denies the received MMIO request 122 or DMA request 123 (e.g., by not translating the virtual memory address indicated in the request, by not writing data indicating the request was completed) and reports the denial to processor core 104 or I/O device 120, respectively.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or another instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still, further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
in response to a transfer failure associated with a virtual machine (VM), modifying one or more bits of a security indicator field associated with an address space identifier (ASID) assigned to the VM to indicate that the VM was a target of an attack; and
in response to receiving a memory-mapped input/output (MMIO) request or direct memory access (DMA) request associated with the VM, preventing, at an input-output memory management circuitry, execution of the received MMIO request or DMA request based on the security indicator field indicating that the VM was a target of an attack.

2. The method of claim 1, further comprising:
executing, by the input-output memory management circuitry, the received MMIO request or DMA request in response to the security indicator field indicating the VM was not a target of an attack.

3. The method of claim 1, wherein the security indicator field is within an ASID mask table maintained by the input-output memory management circuitry.

4. The method of claim 1, wherein the security indicator field includes data indicating all DMA requests associated with the VM are not to be performed.

5. The method of claim 1, wherein the security indicator field includes data indicating all MMIO requests associated with the VM are not to be performed.

6. The method of claim 1, further comprising: modifying one or more bits in the security indicator field to indicate that the VM was not the target of an attack.

7. A method, comprising:
in response to a transfer failure associated with a virtual machine (VM), modifying one or more bits of a security indicator field associated with an address space identifier (ASID) assigned to the VM to indicate that the VM was a target of an attack; and
preventing, at an input-output memory management circuitry, execution of a memory-mapped input/output (MMIO) request or a direct memory access (DMA) request for the (VM) in response to the security indicator field indicating the VM was a target of an attack.

8. The method of claim 7, further comprising:
executing, at the input-output memory management circuitry IOMMU, the MMIO request or DMA request for the VM in response to the security indicator field indicating the VM was not a target of an attack.

9. The method of claim 7, wherein the security indicator field includes data indicating all DMA requests from a specified input/output (I/O) device associated with the VM are not to be performed.

10. The method of claim 7, wherein the security indicator field includes data indicating all MMIO requests associated with the VM are not to be performed.

11. The method of claim 7, wherein the security indicator field is within an ASID mask table maintained by the input-output memory management circuitry.

12. The method of claim 7, further comprising: modifying one or more bits of the security indicator field to indicate that the VM was not the target of an attack.

13. A processor comprising:
an input-output memory management circuitry configured to:
in response to a transfer failure associated with a virtual machine (VM), modifying one or more bits of a security indicator field associated with an address space identifier (ASID) assigned to the VM to indicate that the VM was a target of an attack; and
in response to receiving a memory-mapped input/output (MMIO) request or a direct memory access (DMA) request associated with the VM, prevent execution of the received MMIO request or DMA request based on the security indicator field indicating the VM was a target of an attack.

14. The processor of claim 13, wherein the input-output memory management circuitry is configured to: in response to the security indicator field indicating the VM was not a target of an attack, execute the received MMIO request or DMA request.

15. The processor of claim 13, wherein the security indicator field is within an ASID mask table maintained by the input-output memory management circuitry.

16. The processor of claim 13, wherein the security indicator field includes data indicating all MMIO requests associated with the VM are not to be performed.

17. The processor of claim 13, wherein the security indicator field includes data indicating all DMA requests associated with the VM are not to be performed.

* * * * *